UNITED STATES PATENT OFFICE.

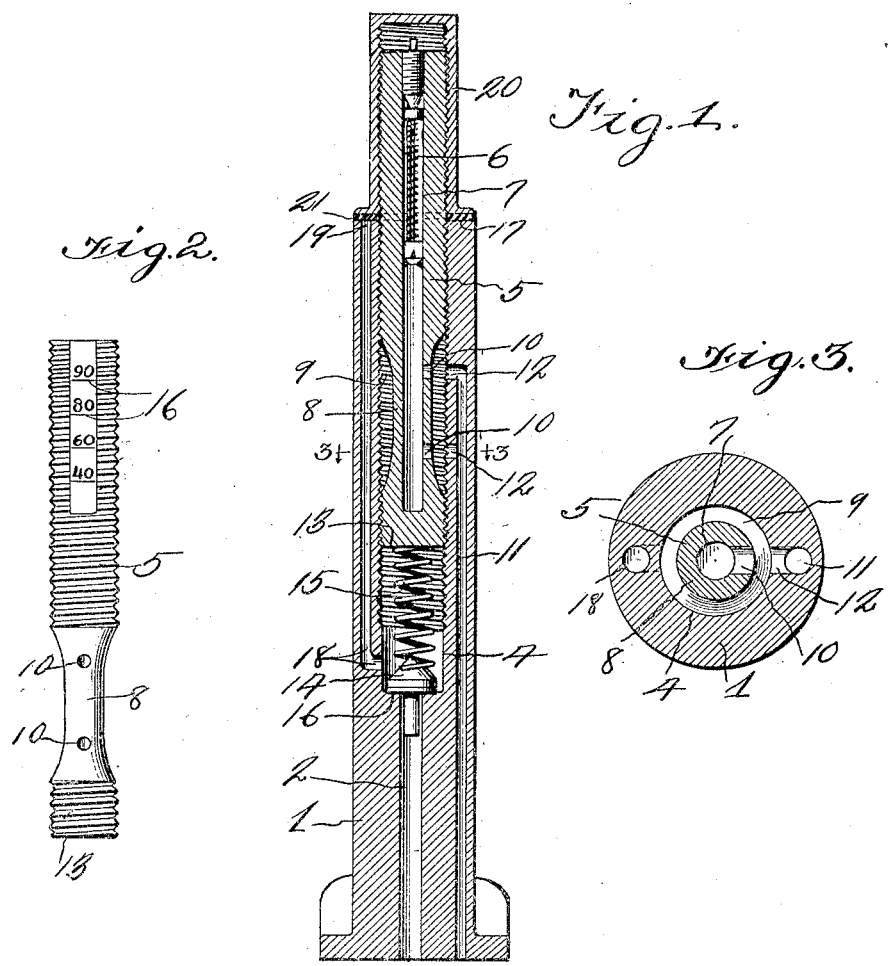

WILLIAM C. LOY, OF ROCHESTER, INDIANA, ASSIGNOR, OF ONE-HALF TO FRANK E. BRYANT, OF ROCHESTER, INDIANA.

TIRE VALVE AND GAUGE.

1,408,012.        Specification of Letters Patent.     Patented Feb. 28, 1922.

Application filed January 18, 1921. Serial No. 438,122.

*To all whom it may concern:*

Be it known that I, WILLIAM C. LOY, a citizen of the United States, residing at Rochester, in the county of Fulton, State of Indiana, have invented a new and useful Tire Valve and Gauge; and I do hereby declare the following to be a full, clear, and exact description of the invention, such as will enable others skilled in the art to which it appertains to make and use the same.

The invention relates to pneumatic tire valves and has for its object to provide a device of this character provided with means whereby pressure above a predetermined amount will be automatically exhausted from the tire through the tire valve, thereby preventing overinflation of the tire.

A further object is to provide a pneumatic tire valve and automatic gauge therefor, said valve comprising a stem having threaded therein a hollow core in which core a conventional form of valve mechanism is disposed, the lower end of said core having passages of communication with a vertically disposed air passage in one side of the valve stem and through which passage air is supplied to the tire. Also to provide a coiled spring interposed between the lower end of the threaded core and a valve which co-operates with a valve seat of an air passage which is in communication with the interior of the tire, which coiled spring may be tensioned by the core whereby air pressure above a predetermined amount will be exhausted to the atmosphere.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a vertical sectional view through the valve stem and gauge.

Figure 2 is a side elevation of the adjustable pressure regulating core carried by the valve stem.

Figure 3 is a horizontal sectional view taken on line 3—3 of Figure 1.

Referring to the drawings, the numeral 1 designates a valve stem, to the lower end of which may be secured a conventional form of inner tube in any conventional manner. The valve stem 1 is provided with a centrally disposed air passage 2, the lower end of which is in communication with the chamber of the inner tube of the tire. Air passage 2 at its upper end discharges into a large threaded bore 4, which bore extends upwardly through the valve stem and has threaded therein a removable and adjustable core 5, said core having a conventional form of valve 6 disposed in the vertical passage 7 thereof. Core 5 adjacent its lower end is provided with a reduced portion 8 thereby forming an annular passage 9 into which passage air during a pumping operation is forced through the apertures 10 in the reduced portion 8 of the core. Valve stem 1 adjacent its side is provided with a vertically disposed air passage 11, the upper end of which is in communication with the chamber 7 through the ports 12 and through said ports and air passage 11, the air is forced into the tire.

Interposed between the lower end 13 of the core 5 and a valve 14 in the bottom of the threaded bore 4 is a coiled compression spring 15, which compression spring normally holds the valve 14 in engagement with the valve seat 16. To prevent overinflation, the core 5 is provided with graduations 16 which indicate pounds of pressure and any of which graduations are adapted to be placed in registration with the upper end 17 of the valve stem 1 for tensioning the spring 15 so that the valve 14 will be raised when the pressure within the tire rises above a predetermined amount. When the valve 14 is forced upwardly the excess air passes through the exhaust port 18 and thence to the atmosphere through the discharge end 19 of the passage. It is to be understood that the dust cap 20 is removed during a pumping operation and the pump hose connected to the upper threaded end of the core 5. When the dust cap is in position as shown in Figure 1, it forces downwardly on the washer 21, which prevents escape of air incident to shocks as the vehicle tire moves over the ground.

When it is desired to ascertain the amount of pressure within the tire, it will only be necessary for the operator to remove the dust cap 20 and slowly unscrew the threaded core 5 until there is an exhaust of air from the end 19 of the exhaust air passage 18 after which the amount of pressure within the tire will be indicated on the scale 16.

The invention having been set forth what is claimed as new and useful is:

A tire valve comprising a valve stem, a vertically disposed air passage in said valve stem, the upper end of said vertically disposed passage being threaded and enlarged, a vertically adjustable threaded core threaded in said enlarged portion of said vertically disposed passage, a valve cooperating with a valve seat between the enlarged portion of the vertically disposed passage and the reduced portion thereof, a coiled spring engaging said valve and the lower end of the threaded core, a passage for the exhaust of air connecting the lower end of the enlarged portion of the air passage and extending to the upper end of the valve stem, a valve mechanism disposed in a chamber of the core, the lower end of said core being reduced, passages of communication between the chamber of the core and an annular chamber formed by the reduced portion of the core, an air passage in communication with the annular chamber and the lower end of the valve stem, and a cap threaded on the upper end of the threaded core and adapted to close the upper end of said core and close the upper end of the exhaust air passage.

In testimony whereof I have signed my name to this specification in the presence of two subscribing witnesses.

WILLIAM C. LOY.

Witnesses:
 JAMES J. DARRAH,
 PRICE ODELL.